United States Patent [19]

Propp et al.

[11] Patent Number: 4,682,452

[45] Date of Patent: Jul. 28, 1987

[54] HANGER ASSEMBLY

[76] Inventors: Clarence E. Propp, Rt. 3, Box 490, College Station, Tex. 77840; J. Russell Kerr, 19 Cargill La., Bryan, Tex. 77801

[21] Appl. No.: 788,952

[22] Filed: Oct. 18, 1985

[51] Int. Cl.[4] ........................ E04H 12/34; F16M 13/00

[52] U.S. Cl. ........................................ 52/118; 220/3.9; 248/DIG. 6; 248/343; 248/57

[58] Field of Search ............................ 52/118; 220/3.9; 248/200.1, 300, DIG. 6, 311.2, 57, 218.3, 105.5, 343; 267/179; 403/104; 174/63; 211/105.4

[56] References Cited

U.S. PATENT DOCUMENTS

| | | | |
|---|---|---|---|
| 404,841 | 6/1889 | Johnson | 211/105.4 |
| 446,203 | 2/1891 | Cochennour et al. | 267/179 |
| 452,965 | 5/1891 | Brothwell | 211/105.4 |
| 520,584 | 5/1894 | Turner | 211/105.4 |
| 565,546 | 8/1896 | Kingston | 211/105.4 |
| 596,108 | 12/1897 | Ganter | 211/105.1 |
| 670,585 | 3/1901 | Fowler | 211/105.4 |
| 772,829 | 10/1904 | Russell | 211/105.4 |
| 954,813 | 4/1910 | La Fleur | 248/218.3 |
| 1,422,921 | 7/1922 | Bylund | 267/179 |
| 1,425,247 | 8/1922 | Galbreath | 211/105.6 |
| 1,789,124 | 1/1931 | Wever | 248/57 |
| 1,820,727 | 8/1931 | Bayles | 248/200.1 |
| 2,199,851 | 5/1940 | Culver | 211/105.2 |
| 2,293,168 | 8/1942 | Pirone | 211/105.4 |
| 2,316,389 | 4/1943 | Atkinson | 248/DIG. 6 |
| 2,713,983 | 7/1955 | Kay | 248/57 |
| 2,974,806 | 5/1961 | Seewack | 211/123 |
| 4,405,111 | 9/1983 | Lennon | 211/105.4 |
| 4,463,923 | 8/1984 | Reiker | 248/DIG. 6 |
| 4,513,994 | 4/1985 | Dover et al. | 248/57 |
| 4,518,141 | 5/1985 | Parkin | 248/DIG. 6 |

FOREIGN PATENT DOCUMENTS

| | | | |
|---|---|---|---|
| 25125 | of 1913 | United Kingdom | 211/105.5 |

*Primary Examiner*—James L. Ridgill, Jr.

*Attorney, Agent, or Firm*—Delmar L. Sroufe; Andres M. Arismendi, Jr.

[57] ABSTRACT

A hanger assembly for one-handed mounting between opposing surfaces of wall studs or ceiling joists in normally inaccessible places. The hanger assembly has telescoping elements with toothed ends which are adapted to pierce into wall studs or ceiling joints when the elements are extended. The telescoping elements are spread apart by planting starter teeth on the follower element into a stud or joist and then turning a main body element until the end teeth of the follower element and the end teeth of the main body unit are fully embedded. The follower element is preferably spring loaded so as to provide the hanger assembly with a following or self-adjusting action. The self-adjusting action causes the hanger assembly to adapt to deformations of the wall studs or ceiling joists and to retain the compressive attachment integrity of the hanger assembly.

2 Claims, 9 Drawing Figures

FIG. 3
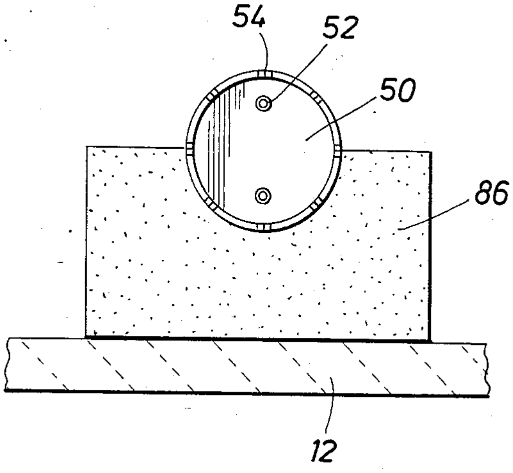
FIG. 4
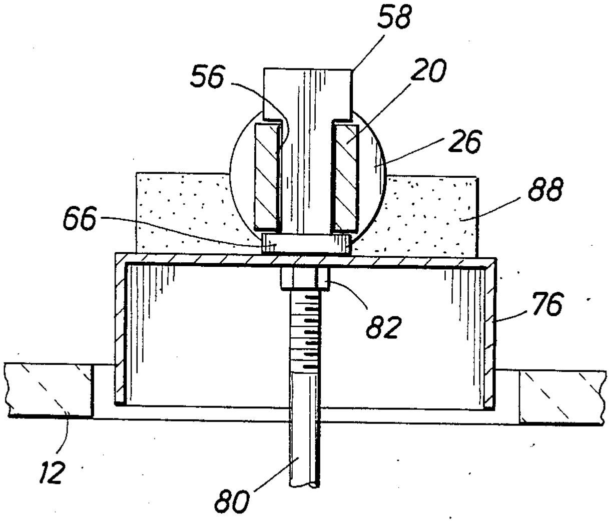
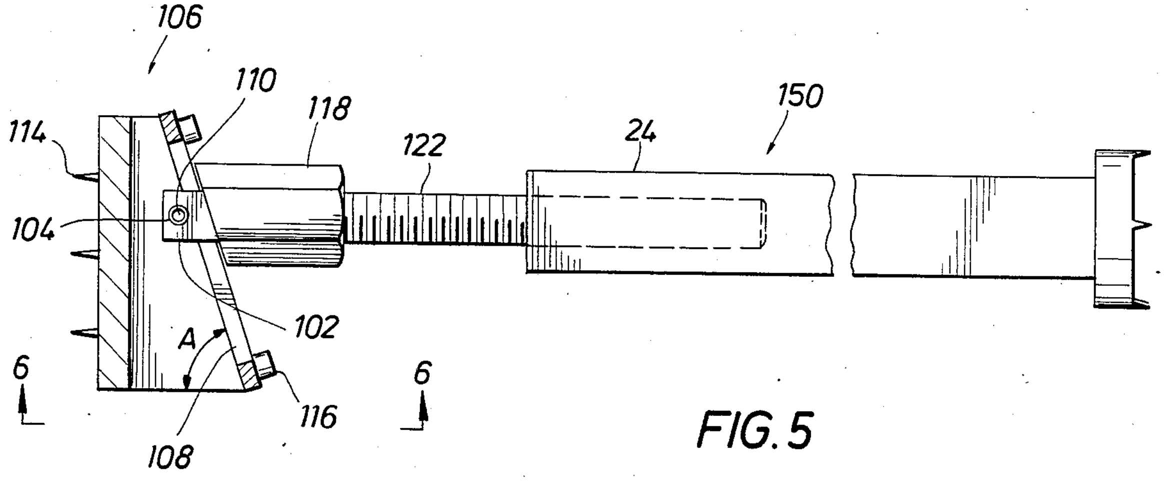
FIG. 5
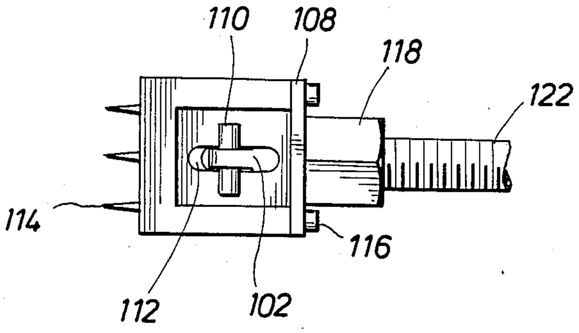
FIG. 6

HANGER ASSEMBLY

BACKGROUND OF THE INVENTION

This invention relates to supports between wall studs and ceiling joists and, more particularly, relates to interjoist supports which can be inserted through relatively small ceiling openings, and manipulated to penetrate into adjacent joists.

The "after construction" mounting of hangers for ceiling fans, heavy lighting fixtures, potted plants, chairs, etc., has heretofore posed a serious problem in inaccessible locations. Standard electrical trade installation methods for ceiling electrical boxes in new construction will safely hold approximately a 10-pound static load. Ceiling fans, for example, present from 25-pound to 100-pound dynamic loads. Therefore, modifications must be made to safely hang heavier dynamic loads.

Adding ceiling fans or other heavy hanging fixtures in a two-story structure between floors is difficult. There are two options to effecting such an installation. The first involves the removal or modification of the ceiling covering to provide access. The second, and generally preferred method, involves accomplishing the entire installation through a standard 4-inch electrical box hole in the ceiling. Typically, these holes are located at various distances between ceiling joints.

The typical method for installing a heavy-duty hanger is to add a structural piece between the ceiling joists from which the electrical box and ceiling fan or other device is hung. If there is no top ceiling cover or if the ceiling cover is off, simple and various reliable installation methods are available. However, if the installation must be accomplished through the 4-inch electrical box hole, the hanger must be inserted through the hole and manipulated to form a structural member under compressive loading between the ceiling joists. Furthermore, compressive loading methods must consider and take into account moderate deformations of ceiling joists to retain compressive attachment integrity. Such deformations are caused by changes in load, temperature, humidity and material degradation.

In the prior art, some devices have been proposed for providing interjoist supports which can be installed through a small ceiling opening, and exemplary of such state of the art devices are depicted and described in the following U.S. Patents, namely: U.S. Pat. Nos. 3,518,421; to Codgill and 4,405,111 to Lennon. Codgill discloses a light-duty support of U-shaped sheet metal which is telescopic and has an end prong 16 at its opposite ends which are forced into opposed joists by spreading the support with a tool 24. While holding tool 24, locking block 30 is inserted to prevent the support from contracting. Apart from requiring the use of two hands and a special tool, the Codgill design is such that it could not be easily installed where the ceiling opening is at the edge of a ceiling joist because the special tool could not be inserted. There is also no provision for moderate deformations of the ceiling joists. Furthermore, under heavy loads, the prongs would tend to be pulled out as the load bends the channel 6.

Lennon, on the other hand, discloses a screw spreadable interjoist support which has lag screws at its opposite ends. The spreading screw forces the threaded ends against the joists so that the ends thread into the joists as their respective body portions are rotated. This construction would seem to prevent spreading of the joists, if the support is sufficiently strong. The lag screw penetration requires great amounts of torque for installation. The use of two wrenches and, accordingly, two hands, are required to effect installation. This design will not allow random location of the ceiling opening and probably would necessitate the elongation of the opening to properly locate the wrenches if the lag screws are very long. Furthermore, care must be exercised in not over extending the device to avoid damaging the ceiling joists.

Neither Codgill nor Lennon make provisions for hanging a heavy load such as a ceiling fan, for example, a J-hook bolt. Codgill only makes specific provisions for the electrical box, which Lennon indirectly indicates.

The prior art also discloses several other devices for installation between two vertical walls or posts. However, none are designed for installation through randomly located, small ceiling or wall panel openings, nor for accommodating hardware for attaching an electrical box or for hanging heavy loads. All require the use of two hands and/or some kind of tool or tools. The majority of these devices relate to light-duty expandable curtain rods which are not suitable for hanging heavy loads. These devices may be subdivided into three catagories. The first category includes rods composed of threaded portions and springs. Screw thread expandable rods without springs make up the second category. Finally, the third category utilizes only a spring to retain a telescoping rod in position.

Devices which are exemplary of the state of the art devices within the first category are depicted and described in the following U.S. Patents, namely U.S. Pat. Nos. 520,584 to Turner; 565,546 to Kingston; 670,585 to Fowler; and 2,199,851 to Culver. With the possible exception of Kingston, the force for compressive attachment to the posts or walls is provided by a spring forcing the ends of the rod apart. The threaded portions are relied on only for length adjustment and/or the extent of spring compression. Such designs are not suitable for hanging heavy loads thereon.

Kingston discloses a curtain rod with springs S at each end and a screw for extending the rod. Here, the force for compressive attachment to the posts or walls is provided by screws attached to a central member. Rotation of the central member relative to the end members forces the ends of the rod apart. Kingston also prefers that the springs be fully compressed to provide positive engagement of the end members. Thereafter the spring will continue to hold the rod in place even if the distance between the vertical support surface changes. If the springs are not fully compressed, then the compressive attachment force is provided only by the spring, as with the others in this category. The Kingston device if adapted for installation through a small ceiling opening would require an opening centrally located between the joists or studs. It also would not be suitable for hanging heavy loads thereon.

Devices which are exemplary of the state of the art devices within the second category are shown and described in the following U.S. Patents, namely: U.S. Pat. Nos. 404,841 to Johnson; 452,965 to Brothwell; 772,829 to Russell; 2,293,168 to Pirone; and 2,974,806 to Seewack. Here, the force for compressive attachment to the posts or walls is provided by a screw forcing the ends of the rod apart. None of these devices provide a following element capable of following or self-adjusting action in response to moderate deformations of wall studs or ceiling joists to retain compressive attachment integrity.

Most of these devices utilize prongs or teeth which are forced into the posts or walls as the rod assemblies lengthen to secure the devices against vertical displacement. Seewack utilizes rubber tips to create a friction fit to avoid marring the post or wall surfaces. The length adjustment in the Seewack, Brothwell and Russell devices are on one of the respective devices' ends. The Pirone device length adjustment is on a centrally disposed turnbuckle screw. None of the prior art devices can be used for randomly located ceiling or wall openings.

Johnson further requires the drilling of a hole into the post or wall prior to installation, which would be difficult to do through a small ceiling or wall opening. The hole receives a stem affixed to one end of the rod to provide a swivel means when the rod is rotated while the prongs on the opposite end of the rod are penetrating the contacted surface.

A device which is exemplary of the state of the art devices within the third category is depicted and described in Galbreath's U.S. Pat. No. 1,425,247. Here, the force for compressive attachment to the posts or walls and rod length adjustment are both provided by a spring forcing the ends of the rod apart. Such a device is totally unacceptable with respect to supporting heavy loads.

Of interest is Ganter's U.S. Pat. No. 596,108, which illustrates the wedge principle. A pair of reversely inclined wedges are attached to each end of a length-adjustable rod. The inner wedges are free to slide vertically on the outer wedges, so that a downward pull on the pole causes the inner wedges to force the outer wedges against the jamb, thereby tightly clamping the rod between the sides of the posts or walls. Heavy loads may reliably be hung on this device. However, this device is not suitable for a one-hand installation through a ceiling hole.

These, and other limitations and disadvantages of the prior art and especially of the aforementioned patents, are overcome with the present invention and commercially acceptable embodiments of a hanger assembly and the like are herein provided. Such embodiments are especially suitable for use by a person of only limited skill and capacity to easily install this hanger assembly of the present invention through a small ceiling opening using only one hand without the need for any tools. The embodiments of the present invention are also capable of use for installations which are beyond the capabilities of the prior art. More particularly, however, presently preferred embodiments of this invention are capable of following or self-adjusting action in response to moderate deformations of ceiling joists to retain compressive attachment integrity.

SUMMARY OF THE INVENTION

Accordingly, a feature of the present invention is to provide a hanger assembly which can be installed through a relatively small opening in a wall or ceiling panel.

Another feature is to provide a hanger assembly with a jackscrew arrangement for compressive attachment.

A further feature is to provide a hanger assembly which can be installed or removed by using a single hand without the aid of any tools.

Yet another feature is to provide a follower element capable of following or self-adjusting action in response to moderate deformations of wall studs or ceiling joists to retain compressive attachment integrity.

A further feature is to provide the hanger assembly with toothed ends to achieve wood penetration ease, penetration point distribution to account for random knots and grain faults, and high shear strengths from both the penetrant teeth and the wooden studs or joists.

Yet another further feature is to accommodate an opening in all possible locations between wall studs or ceiling joists.

Another feature is to provide an universal or adaptable load attachment means and methods for ceiling fans or other hanging fixtures.

A further feature is to provide a load attachment means which increases the strength of the hanger assembly in the direction of applied load when the load attachment means is affixed thereto.

The foregoing features and other features of the invention are realized in an illustrative embodiment of a hanger assembly which can be installed through a 4-inch opening in a wall or ceiling panel. It will normally be installed between joists of a ceiling but it may be used between wall joists, particularly sloping walls, such as the walls of an "A" frame building. This hanger assembly comprises jackscrew means comprising two telescoping members, a main body having internal threads engaged by the external threads on a threaded rod. A follower means is attached to the free end of the rod. The follower means of the presently preferred embodiment is spring-loaded and comprises a cylinder, a piston slideably fitted therein, and a coil spring interposed between the interior face of the cylinder's base and the head of the piston. Other conventional biasing means may be used for the follower assembly, such as an elastomer filler (for example, foam rubber), pneumatic cylinders, and the like. A plurality of end teeth are perpendicularly attached to the perimeter of the cylinder's base. Furthermore, a plurality of starter teeth extending beyond the end teeth are perpendicularly attached to the exterior face of the cylinder base.

A swivel end means comprising a disk is rotatably attached to the free end of the main body. As with the follower means, a plurality of end teeth are perpendicularly attached about the perimeter of the outer face of the swivel end means.

After the hanger assembly is inserted through the 4-inch opening and positioned with respect to same, the starter teeth of the follower means are planted by relatively light hand force into the ceiling joist furthest from the opening. The main body is then rotated by hand until the end teeth on the follower means and on the swivel end means are fully embedded.

A slot extends along the length of the main body between its two ends such that structurally the main body appears as two parallel beams joined at the main body's ends and having a space between them. The slot receives a load attachment means which comprises a slide bar having a T-shape with a plurality of drilled and tapped cylindrical holes in the base of same, a retaining plate, and a retaining screw. The horizontal portion of the slide bar rests upon the parallel beams while the vertical portion is slideably fitted within the slot in the main body. After centrally positioning the slide bar with respect to the opening, a retaining plate and a retaining screw secure the slide bar in place for attachment of an electrical box. Cylindrical threaded holes in the base of the slide bar are provided for the attachment of a J-hook bolt or other hanging hardware from which a heavy load may be hung, such as a ceiling fan. Alternatively, a U-bracket or other hanging hardware may be attached directly to the electrical box so as to support said heavy load. In such a configuration, a cap screw is substituted for the J-hook bolt so as to further secure the electrical box to the slide bar. After the attachment of the hanging hardware, the slide bar and the retaining plate strengthen the main body in the direction of applied load.

Accordingly, these and other features and advantages of the present invention will become apparent from the following detailed description, wherein reference is made to the figures in the accompanying drawings.

IN THE DRAWINGS

FIG. 3 is an end view of the follower end taken essentially on line 3—3 of FIG. 1.

FIG. 4 is an enlarged cross-sectional view taken essentially on line 4—4 of FIG. 2.

FIG. 5 is a partial side elevation of another embodiment of the present invention.

FIG. 6 is a partial bottom elevation of another embodiment of the follower end taken essentially on line 6—6 of FIG. 5.

DESCRIPTION

Figures 1, 2:
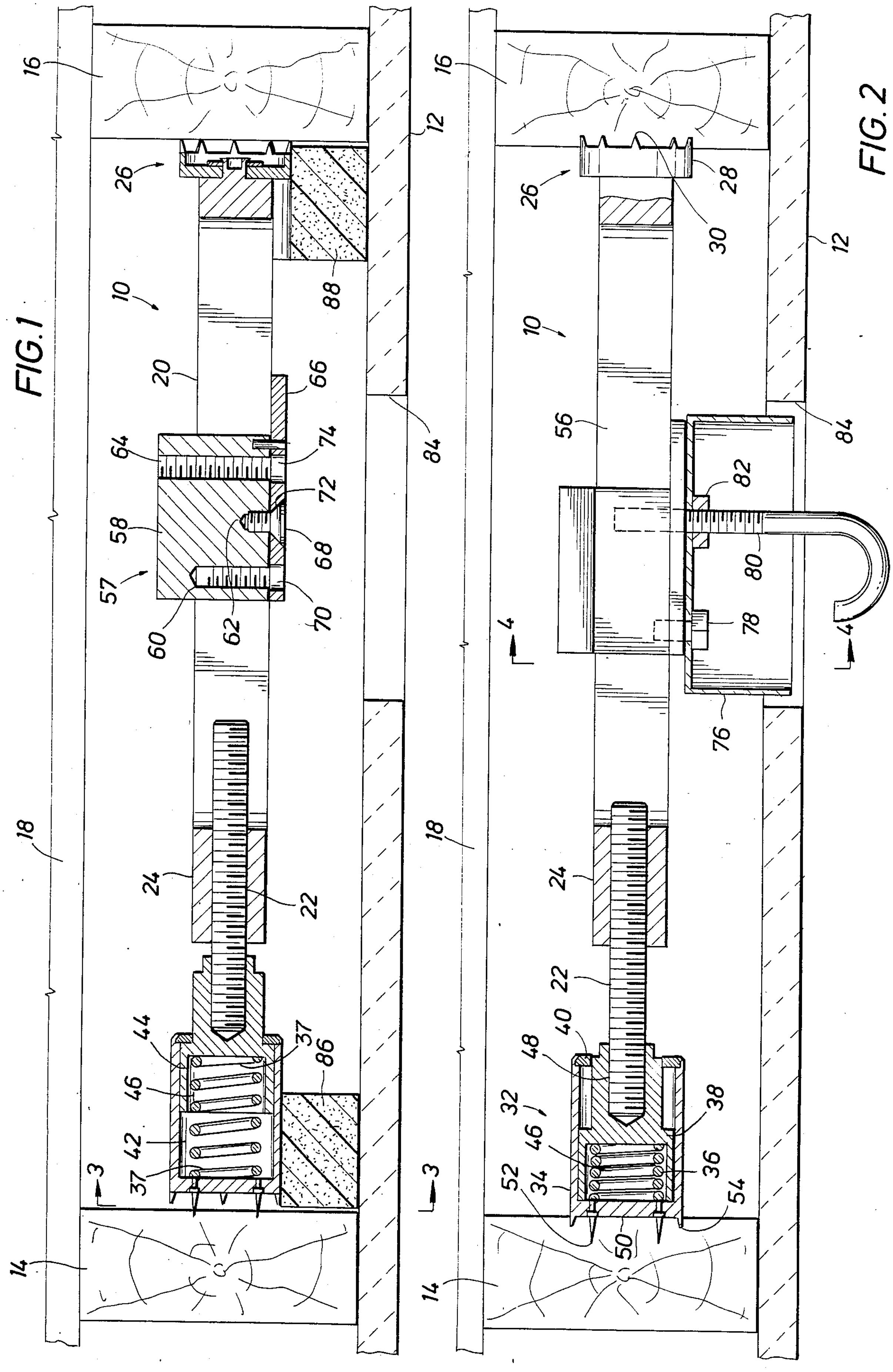
FIG. 1 is a side elevation sectional view of a hanger assembly embodyihg the concepts of the present invention in a pre-installation position.
FIG. 2 is a side elevation of a hanger assembly embodying the concepts of the present invention in an installed position and partly in longitudinal section.

Referring now to the drawings in which like numerals denote similar elements, and more particularly to FIGS. 1 and 2, there is shown by way of illustration, but not of limitation, a hanger assembly 10 mounted above a ceiling 12 of a building which includes spaced joists 14 and 16 supporting the ceiling 10 and floor 18 above. The hanger assembly 10 comprises a jackscrew arrangement between an elongated main body 20 and an externally threaded rod 22. One end of the main body 20 is provided with an internally threaded end section 24. The threaded end section 24 receives and threadedly engages one end of the rod 22.

A swivel end 26 is rotatably mounted on the other end of the main body 20. The swivel end 26 comprises a disk 28 with a plurality of end teeth 30 perpendicular to the outward face of the disk 28 and disposed about the perimeter of same.

A follower end 32 is attached to the other end of the rod 22. The follower end 32 comprises a cylinder 34, a coil spring 36, a piston 38 and a retainer 40. The piston 38 is slideably fitted within the cylinder 34 forming a chamber 42. The spring 36 is contained within the chamber 42. The retainer 40 maintains the piston 38 within the cylinder 34.

A hollow annular collar 44 on the inward portion of the piston 38 forms a cup-like recess 46. The recess 46 dimensions correspond to a diameter larger than that of the spring 36 and a height equal at least to the height of the spring 36 in a stacked or fully compressed position. Thus, the collar 44 acts as a stop with respect to the compression of the spring 36 to avoid damaging same.

An internally threaded section 48 is provided on the outward portion of the piston 38. The threaded section 48 receives and threadedly engages the other end of rod 22 thereby attaching the follower end 32 to same.

The base 50 of the cylinder 34 is provided with a plurality of starter teeth 52 and end teeth 54. The plurality of starter teeth 52 are attached to or form an integral portion of the base 50 and are perpendicular to and on the outward face of same. The plurality of end teeth 54 are attached to or form an integral portion of the base 50. The end teeth 54 are perpendicular to the outward face of the base 50 and are positioned about the perimeter of same.

An elongated slot 56, shown in cross section in FIG. 4, extends along the length of the main body 20 between the threaded end section 24 and the swivel end 26. The slot 56 may conveniently be provided by milling the slot 56 in a body of square bar stock. Structurally, the main body 20 appears as two parallel beams joined at the ends of the main body 20 and having a space, slot 56, between them. The slot 56 receives a load attachment carrier 57 which comprises a slide bar 58 having a T-shape with a plurality of internally threaded cylindrical holes perpendicular to the base of same, a retaining plate 66, and a retaining screw 68. The slide bar 58 in this particular embodiment includes a first threaded hole 60, a second threaded hole 62, and a third threaded hole 64. The third threaded hole 64 extends the entire height of the slide bar 58. The horizontal portion of the slide bar 58 rests upon the parallel beams of the main body 20 while the vertical portion of the slide bar 58 is slideably fitted within the slot 56.

The slide bar 58 may be positioned at any location along the slot 56. A retaining plate 66 with a plurality of holes corresponding to the plurality of slide bar 58 threaded holes and a retaining screw 68 maintain the slide bar 58 at the desired location along the slot 56. In this particular embodiment, the retaining plate 66 contains a first hole 70, a second hole 72, and a third hole 74 corresponding to the three slide bar 58 threaded holes 60, 62 and 64, respectively. The retaining screw 68 is inserted through the second hole 72. The second threaded hole 62 receives and threadedly engages the retaining screw 68 thereby securing the slide bar 58 in place.

An electrical box 76 is secured to the load attachment carrier 57 by means of a screw 78 and a J-hook bolt 80 with a lock nut 82. The screw 78 is inserted through the first hole 70. The first threaded hole 60 receives and threadedly engages the screw 78 thereby securing the electrical box 76 in place. The J-hook bolt 80 with the lock nut 82 positioned at the neck of the J-hook bolt 80 is inserted through the third hole 74. The third threaded hole 64 receives and threadedly engages the J-hook bolt 80. The J-hook bolt 80 position is adjusted to the desired extension below the base of the electrical box 76 and is locked in place with the lock nut 82 thereby further securing the electrical box 76 in place.

Referring to FIG. 1, the hanger assembly 10 is installed by initially either removing the existing electrical box or cutting a new 4-inch diameter hole in the ceiling 12. Most two-story structures have ceiling joists 14 and 16 on 16-inch centers which corresponds to 14.5 inches between inside surfaces. Therefore, the hanger assembly 10 is first adjusted to a length of 14 inches by screwing the threaded rod 22 into or out of the threaded end section 24 of the main body 20. The slide bar 58 is adjusted for the proximity of the 4-inch diameter hole 84 in the ceiling 12 by orienting the hanger assembly 10 with the swivel end 26 oriented closest to the hole 84. The slide bar 58 is adjusted by positioning same along the slot 56 and securing same with the retaining plate 66 and the retaining screw 68.

The hanger assembly 10 is then inserted through the hole 84 in the ceiling 12 and positioned resting close to the hole 84. Two positioning blocks 86 and 88 each with a semi-circular cradle or channel are inserted through the hole 84. The positioning blocks 86 and 88 are positioned with the cradle up next to the ceiling joists 14 and 16, respectively, and resting on the ceiling 12.

If the hole 84 is next to a ceiling joist, measure 1-3/16 inches up from the bottom of the joist (or such other measurement as may be necessary for the positioning of the electrical box 76 within the hole 84) and pencil in a line on the joist to gage the height of the swivel end 26. The follower end will be placed on positioning block 86. For other positions of hole 84, both ends of the hanger assembly 10 are placed onto the positioning blocks 86 and 88. The positioning blocks 86 and 88 are positioned such that the hanger assembly 10 is approximately across the center of the hole 84 and perpendicular to the joists 14 and 16. The main body 20 is grasped and pressure applied toward the follower end 32. The objective is to sink the starter teeth 52 into the joist 14 and to maintain the hanger assembly 10 on the hole 84 center line. The main body 20 is rotated about its long axis until the swivel end 26 touches the joist 16. If the hole 84 is next to a ceiling joist, the swivel end is held in position by reference to the penciled line discussed above.

The alignment of the hanger assembly 10 is checked and corrected if necessary. This position corresponds to that depicted in FIG. 1. Further rotation of the main body 20 in the same direction results in the compression of the coil spring 46 until the spring's stacked position is achieved. At this point, the annular collar 44 makes contact with the base 50 of the cylinder 34 and prevents further compression of the spring 36 to avoid damaging same. The hand turning load will also go up when the spring 36 is compressed. However, the hanger assembly 10 is designed so that with one hand through the 4-inch hole 84 the average adult man or woman can rotate the main body 20 with sufficient torque without the use of tools to sink the end teeth 30 and 54 fully into the wooden joists 16 and 14, respectively. This capability also avoids the possibility of causing structural damage. Furthermore, this particular toothed end design not only achieves wood penetration ease, but also achieves a distribution of point penetration to account for random knots and grain faults, while achieving high shear strengths from both the penetrant end teeth 30 and 54 and the wood joists 14 and 16.

Referring to FIG. 3, there is illustrated a presently preferred follower end 32 with pre-engaging means comprising starter teeth 52. Also illustrated is the pattern of end teeth 54. During the installation procedure, the main body 20 is rotated by hand after setting the starter teeth until the end teeth 30 and 54 are fully embedded.

The ends of the coil spring 36 are turned out to prevent the piston 38 from rotating within the cylinder 34 when the main body 20 is rotated. These ends form locking tabs 37 which dig into the interior faces of the piston 38 and the base 50 of the cylinder 34 due to the force exerted by the spring 46 in an outward direction.

Once the end teeth 30 and 54 are fully embedded, the main body 20 is rotatably adjusted such that the retaining plate 66 faces downward. The slide bar 58 is adjusted so as to center same with respect to the 4-inch hole 84. The slide bar 58 is then secured in place with the retaining plate 66 and retaining screw 68. After the electrical wires have been secured to the electrical box 76, the electrical box 76 is placed up against the retaining plate 66 and secured to the load attachment carrier 57 with screw 78.

The J-hook bolt 80 with the lock nut 82 positioned at the neck of the J-hook bolt 80 is inserted through the third hole 74 of the retaining plate 66. The third threaded hole 64 receives and threadedly engages the J-hook bolt 80. With respect to mounting ceiling fans, the ceiling fan mounting grommet or doughnut is inserted into the J-hook portion of the bolt 80. The J-hook bolt 80 is adjusted to the proper height and secured in place with the lock nut 82. For ceiling fans, the remainder of the installation is completed using the fan mounting instructions. FIG. 2 depicts an installed hanger assembly 10.

Referring now to FIG. 4, there is shown a cross-section of the hanger assembly 10 at one end of the load attachment carrier 57. The slide bar 58 is a T-shaped member. When the slide bar 58 is slideably fitted in the slot 56, the vertical portion of the slide 58 is within the slot 56. The horizontal portion of the slide 58 rests upon the main body 20 above the slot 56. Once the retaining plate 66, electrical box 76 and J-hook bolt 80 are attached to the slide bar 58, the main body 20 is rigidified and strengthened in the direction of applied load.

The 'follower end 32 automatically maintains the compressive attachment integrity of the hanger assembly 10. Ceiling joists 14 and 16 have a tendancy to move or shift slightly because of changes in load, temperature, humidity and material degradation. Once the hanger assembly 10 is installed, the stacked up energy of the spring 36 within the follower end 32 provides the hanger assembly 10 with a following or self-adjusting action in response to moderate deformations of the ceiling joists 14 and 16. Thus, the compressive attachment integrity of the hanger assembly 10 is maintained.

This self-adjusting action may alternatively be provided by substituting for coil spring 36 any suitable biasing means, such as a compressed gas charge, with means for sealing the piston 38 within the cylinder 34 to maintain the charge.

Referring now to FIGS. 5 and 6, there is shown an alternative self-adjusting joist shift follower. The threaded end section 24 receives and threadedly engages one end of the threaded rod 122. The other end of the rod 122 has a flat tab 102 with a retaining pin hole 104. The wedge 106 with guide plate 108 replaces the follower end 32. The wedge surface parallel to joist 14 is provided with a plurality of end teeth 114 to anchor the wedge 106 to the joist 14. The guide plate 108 is mounted on the wedge 106 at an angle A with respect to the ceiling 12. The guide plate 108 is provided with vertical slot 112 which is adapted to receive the flat tab 102. A wedge capture nut 118 is provided with one flat perpendicular face and one angular face. The angle of the angular face equals the angle A at which the guide plate 108 is mounted. The wedge capture nut 118 is screwed onto the rod 122 with its flat face facing the threaded end section 24. The angular face of capture nut 118 rests on the guide plate 108 with the flat tab 102 inserted into the vertical slot 112. A retaining pin 110 is inserted in the hole 104 to retain the flat tab 102 within the vertical slot 112. Thus, after installation of the hanger assembly 150, the capture nut 118 slides up or down the guide plate 108 as the joists 14 and 16 move together or apart, respectively.

In the foregoing embodiments, the hanger assembly 10 design achieves a maximum beam strength geometry in the direction of applied load while accommodating a jackscrew and fully adjustable load attachment carrier 57 for attaching the electrical box 76 and heavy loads such as a ceiling fan. Furthermore, the load attachment carrier 57 increases the strength of the main body 20 when affixed thereto.

Therefore, it will be readily noted that a novel and effective hanger structure has been provided. The parts cooperate in a novel and effective manner to retain the hanger assembly in tight assembly with joists or studs and to sustain a substantial dynamic weight of up to 400 pounds. The novel hanger assembly is easily installed by hand either in difficult locations or in normal installations.

Figure 7:
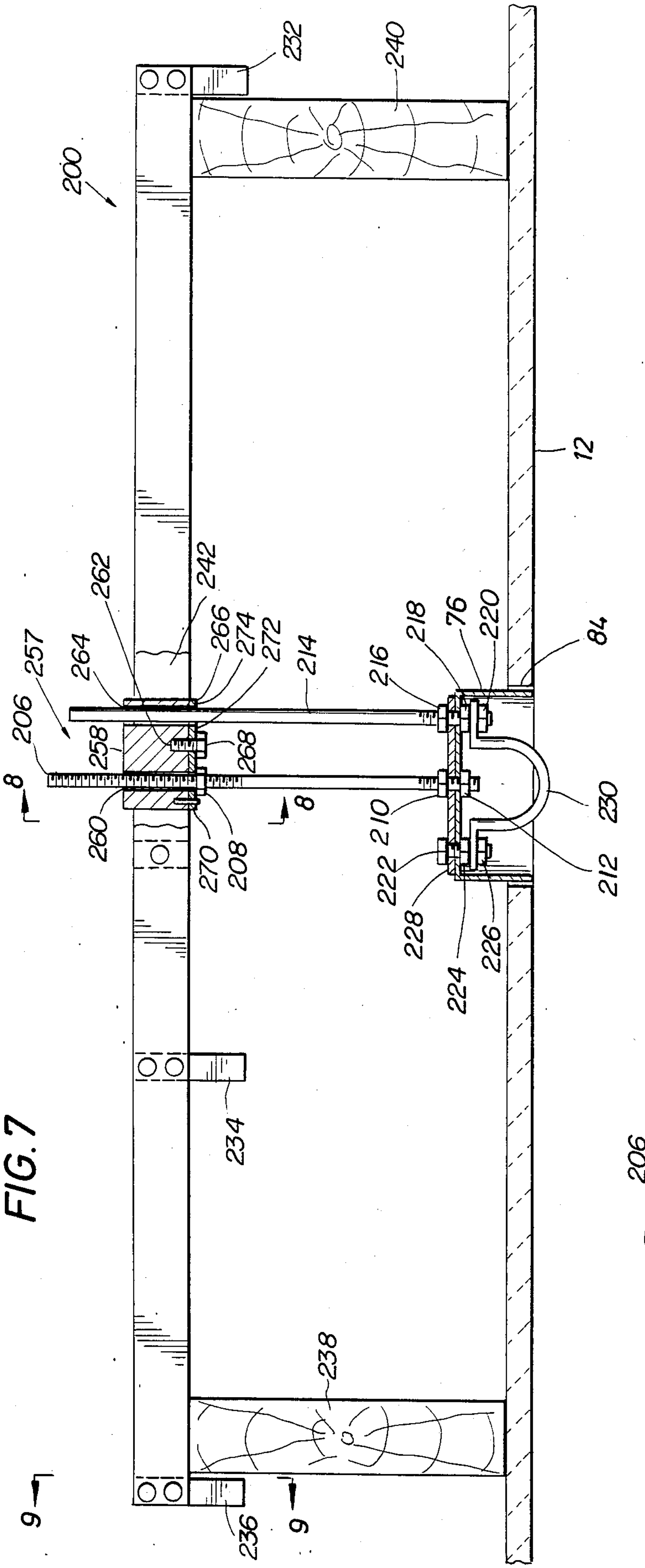
FIG. 7 is a side elevation of a parallel beam hanger using the load attachment carrier of the present invention.
Figure 9:
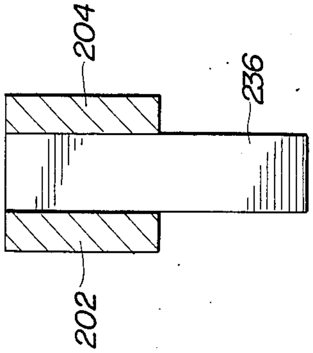
FIG. 9 is an enlarged cross-sectional view taken essentially on line 8—8 of FIG. 7.
Figure 8:
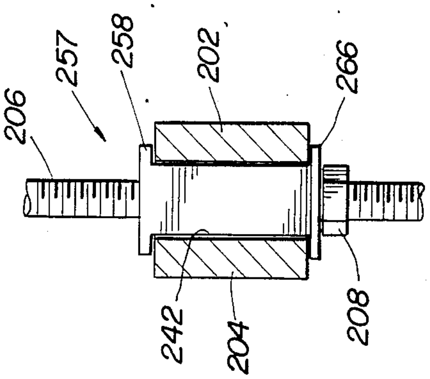
FIG. 8 is an enlarged cross-sectional view of the load attachment carrier taken essentially on line 8—8 of FIG. 7.

Referring now to FIG. 7, there is shown another embodiment of a load attachment carrier 57 being used with a twin-beam hanger 200. The twin beam hanger 200 comprises two beams 202 and 204 fastened to stop strips at the ends thereof, maintaining the space between the beams, thereby creating a slot 242 between the two beams 202 and 204. FIG. 9 shows the positioning of stop strip 236 between the two beams 202 and 204. The stop strips 232 and 234 are spaced to accommodate ceiling joists on 16-inch centers. The stop strips 232 and 236 are spaced to accommodate ceiling joists on 24-inch centers. Although joists are commonly spaced on 16-inch or 24-inch centers, obviously the hanger embodiment of FIGS. 7–9 may be adapted to any spacing desired.

Once installed (See FIG. 7), the twin-beam hanger 200 rests upon the ceiling joists 236 and 240 with the stop strips 232 and 236 extending downward adjacent to the outward facing surfaces of the joints 240 and 238, respectively.

As with the hanger assembly 10, the slot 242 of twin-beam hanger 200 receives the load attachment carrier 257. This is shown more clearly in FIG. 8. The horizontal portion of the slide bar 258 rests upon the parallel beams 202 and 204 while the vertical portion of the slide bar 258 is slideably fitted within the slot 242 between the beams 202 and 204. The slide bar 258 in this particular embodiment includes a first threaded hole 260, a second threaded hole 262, and a third threaded hole 264. The first threaded hole 260 and the third threaded hole 264 extend through the entire height of the slide bar 258.

The slide bar 258, as before, may be positioned at any location along the slot 242 between the beams 202 and 204. The retaining plate 266 and the retaining screw 268 maintain the slide bar 258 at the desired location along the slot 242. The retaining screw 268 is inserted through the second hole 272 in the retaining plate 266 as before. The second threaded hole 262 receives and threadedly engages the retaining screw 268 thereby securing the slide bar 258 in place.

A threaded support rod 206 is inserted through hole 270 and is then screwed into the threaded hole 260 and adjusted to a proper height. The support rod 206 is locked in place with a lock nut 208.

An anti-torque rod 214 is inserted through hole 274 and is then screwed into the threaded hole 264. A brace 228 with three equally spaced holes corresponding to the appropriate knock-outs of the electrical box 76 is attached to the electrical box 76 with a bolt 222 and a nut 224 using one of the outer holes in the brace 228. The electrical box 76 is secured to the support rod 206 by inserting same through the center hole in the brace 228 and using nuts 210 and 212. For flush mounting of the electrical box 76 with respect to the ceiling 12, the support rod 206 is adjusted up or down with respect to the load attachment carrier 257. The anti-torque rod 214 is simultaneously inserted in the remaining outer hole in the brace 228 and secured to the electrical box 76 using nuts 216 and 218. The anti-torque rod 214, as the support rod 206, may be adjusted up or down as needed with respect to the load attachment carrier 257. A U-bracket holder 230 is then attached to bolt 222 and the anti-torque rod 214 using nuts 226 and 220. The rest of the ceiling fan installation is completed using the fan mounting instructions. FIG. 7 depicts an installed twin-beam hanger 200 utilizing a load attachment carrier 257. As before, the load attachment carrier 257 increases the strength of the hanger 200 in the direction of the applied load.

It will be apparent from the foregoing that many other variations and modifications may be made in the apparatus and methods hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. In a hanger assembly for supporting a load such as an electrical fixture from ceiling joists, a fixture support unit comprising:
   - a pair of parallel support beams having a slot between same, said support beams being positioned with an opening facing the direction of said load;
   - a T-shaped slide bar having a horizontal portion resting upon said parallel beams, said slide bar further having a plurality of internally threaded cylindrical holes passing therethrough;
   - a retaining plate having a plurality of holes corresponding to said plurality of threaded cylindrical holes;
   - a retaining screw passing through one of said holes in said retaining plate and into a threaded hole in said slide bar for securing said slide bar at a selected position within said slot;
   - an electrical box;
   - a threaded support rod for adjusting said electrical box to a proper height, said support rod being inserted through a second hole of said plurality of retaining plate holes, threadedly engaging a second corresponding hole of said plurality of threaded cylindrical holes, and being adjusted to said proper height;
   - a first lock nut for securing said support rod at said proper height;
   - a threaded anti-torque rod for countering any rotational forces acting on said electrical box caused by said fixture, said anti-torque rod being inserted through a third hole of said plurality of retaining plate holes, threadedly engaging a third corresponding hole of said plurality of threaded cylindrical holes, and being adjusted to said proper height;

a second lock nut for receiving said anti-torque rod at said proper height;

means for attaching said electrical box to said support and anti-torque rods; and means for attaching said fixture to said electrical box.

2. In a hanger assembly for supporting a downward exerted load such as an electrical fixture from ceiling joists, a fixture support unit comprising:

(a) a pair of parallel support beams having means attached thereto for maintaining a slot between said support beams being positioned with an opening of said slot facing downward in the direction of said load;

(b) a load attachment carrier having (1) an upper horizontal portion which rests upon the upper surface of said support beams, (2) a vertical portion extending downward from said upper horizontal portion between said support beams within said slot, (3) a lower horizontal portion to which said vertical portion extends, said lower horizontal portion being adjacent to the bottom surface of said support beams; and (4) said load attachment carrier having a plurality of internally threaded cylindrical holes passing upwardly therethrough;

(c) a threaded support rod for adjusting said load to a desired height, said support rod threadedly engaging one of said plurality of threaded cylindrical holes and being adjusted to said desired height by rotation through said threaded cylindrical hole;

(d) a threaded anti-torque rod for countering any rotational forces caused by said load, said anti-torque rod threadedly engaging another of said plurality of threaded cylindrical holes and being adjusted to said desired height;

(e) means for attaching said load to said support rod; and (f) means for attaching said load to said anti-torque rod.

* * * * *